July 6, 1943.　　　　　T. R. JACOBS　　　　　2,323,542
AEROPLANE WING CONSTRUCTION
Filed Sept. 19, 1941　　　　3 Sheets-Sheet 2

Inventor
Theodore Richard Jacobs

By Clarence A. O'Brien

Attorney

July 6, 1943.  T. R. JACOBS  2,323,542
AEROPLANE WING CONSTRUCTION
Filed Sept. 19, 1941  3 Sheets-Sheet 3

Inventor
Theodore Richard Jacobs
By Clarence A. O'Brien
Attorney

Patented July 6, 1943

2,323,542

UNITED STATES PATENT OFFICE 2,323,542

AIRPLANE WING CONSTRUCTION

Theodore Richard Jacobs, Duluth, Minn.

Application September 19, 1941, Serial No. 411,566

2 Claims. (Cl. 244—44)

This invention relates to new and useful improvements in airplanes and more particularly to an improved leading edge structure for aircraft wings.

The principal object of the present invention is to provide an adjustable aircraft wing leading edge which can be varied in disposition to increase or decrease the lifting capacity of a wing.

Other objects and advantages of the invention will become apparent to the reader of the following description.

In the drawings—

Figure 5 is a fragmentary perspective view showing one of the outermost sections.

Figure 1:
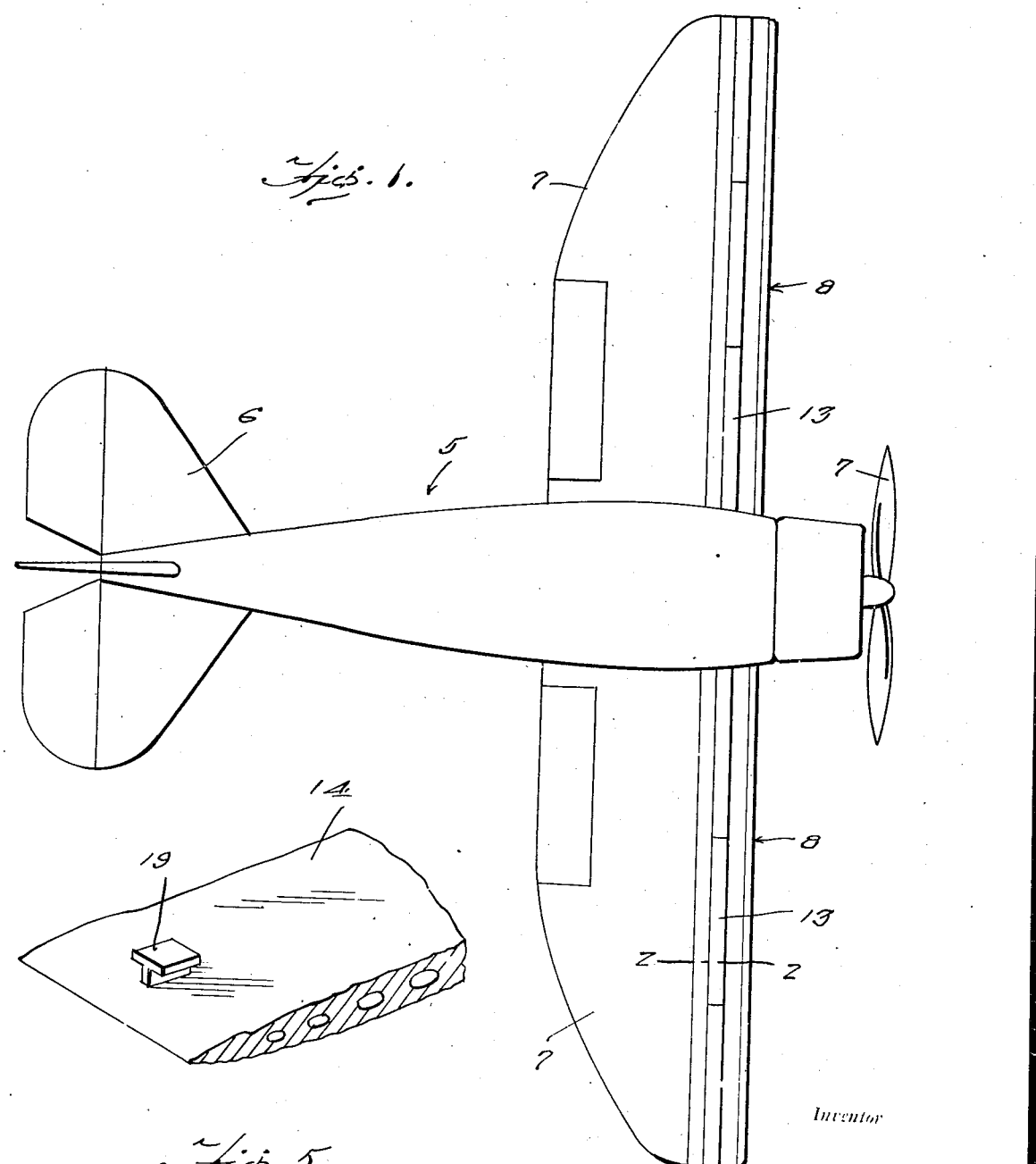
Figure 1 represents a top plan view of an airplane having its wings equipped with the improved leading edge.

Referring to the drawings wherein like numerals designate like parts, it can be seen in Figure 1 that numeral 5 generally refers to an aircraft having the conventional tail structure and propulsion means A. The aircraft is shown with laterally disposed wings 7, 7 which in the present instance are equipped with the improved leading edge structure generally referred to by numeral 8 and which makes up the present invention.

Figure 2:
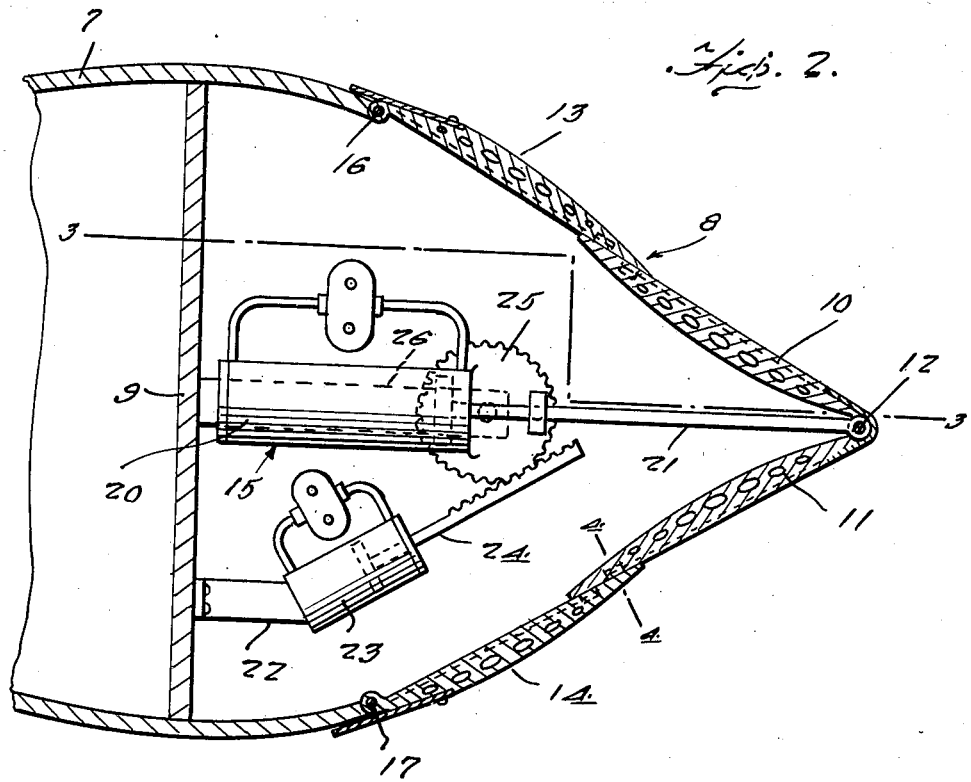
Figure 2 is a sectional view taken substantially on the line 2—2 of Figure 1.
Figure 4:
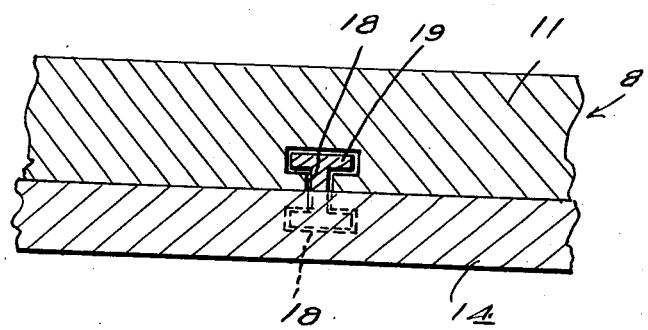
Figure 4 is an enlarged detailed sectional view taken substantially on the line 4—4 of Figure 2.

As can be seen in Figure 2, a vertically disposed and longitudinally extending partition 9 is provided in the forward portion of each wing 7 while the upper and lower walls of the wing extend somewhat forwardly of the partition 9.

The leading edge structure 8 consists of an elongated upper member 10 and an elongated lower member 11 which are hingedly connected together at their forward edges as at 12.

Figure 3:
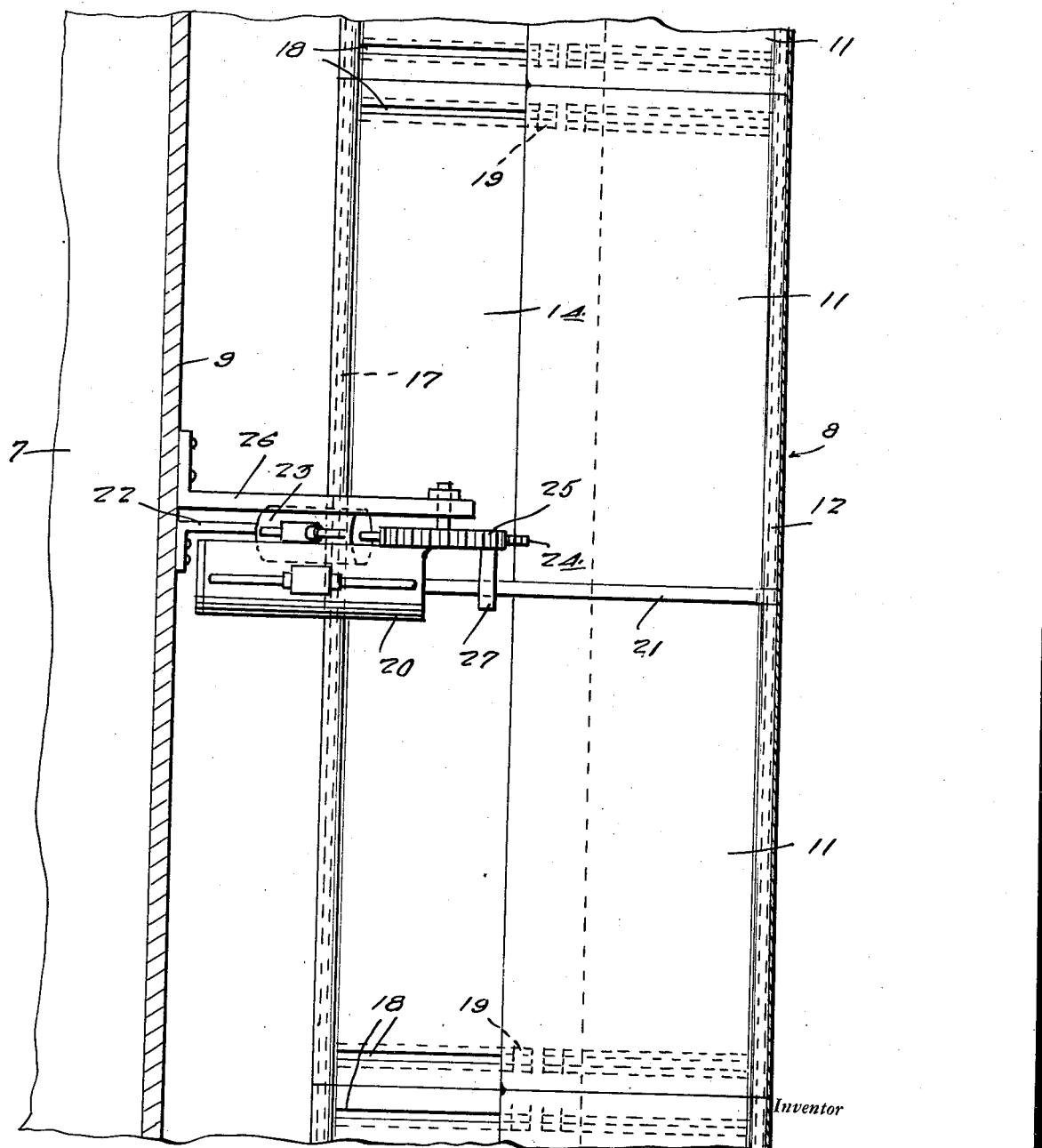
Figure 3 is a fragmentary horizontal sectional view taken substantially on the line 3—3 of Figure 2.

These elongated members 10 and 11 are in sections as suggested in Figure 3. These sections go together with additional sections 13 and 14 to make up a sectional unit of a leading edge and each unit has an operating mechanism generally referred to by numeral 15.

It can be seen that the upper and lower inner sections 13, 14 are hingedly connected as at 16 and 17 to the forward edges of the upper and lower walls of the wing 7.

The sections 13, 10 and 14, 11 are provided with guide means consisting the provision of a T-slot 18 in each and a connecting H-shaped guide element 19. Thus the sections at the top and bottom of the leading edge structure are slidably connected together.

The operating means consists in the provision of a fluid cylinder 20 having an operating rod 21 extending therefrom and connected to the hinge 12. The operating means further consists of a bracket 22 provided on the wall 9 and supporting a fluid cylinder 23 from the piston in which a rack 24 extends and meshes with a gear 25 rotatably supported by a bracket 26 on the wall 9. A member 27 projects laterally from the gear 25 and embraces the rod 21.

It can now be seen that by operating the cylinder 20 the rod 21 will be extended or retracted depending upon whether the leading edge is to be disposed outwardly or contracted to make a snub leading edge formation.

To vary the lifting effect of the leading edge structure, the cylinder 23 is brought into use and obviously when the rack 24 is extended or retracted the gear 25 is rotated to either lift or lower the rod 21 with the result that the sections 10, 13, 11, 14 are so arranged as to give the desired lift or streamlining to the wing leading edge.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In an aircraft, a wing structure having a leading edge construction, said leading edge construction consisting of an upper section, a lower section, said upper and lower sections being hingedly connected together at their forward edge, inner upper and lower sections, said inner sections being hingedly connected to the wing structure, sliable connections between the upper sections and slidable connections between the lower sections, and extending and retracting means for the sections, said extending and retracting means for the sections consisting of a fluid cylinder, a rod extending from the cylinder and connected to the hinged connections of the first-mentioned sections, a gear, means to rotatably mount said gear alongside said rod, a second cylinder including a piston, a rack extending from the piston and in mesh with the gear, and means on the gear embracing the rod to lift or lower the rod as the gear is rotated.

2. An aircraft wing including a leading edge structure comprising upper and lower forwardly converging sections having front edges hinged together for relative swinging of the sections into different angular relation, means to mount the sections on said wing for unitary adjustment vertically and also forwardly and rearwardly whereby said sections are swung into different angular relations, and means to move said sections vertically and forwardly and rearwardly selectively.

THEODORE RICHARD JACOBS.